United States Patent
Ekladyous et al.

(10) Patent No.: US 11,022,519 B2
(45) Date of Patent: Jun. 1, 2021

(54) HIGH-VOLUME, LONG-RANGE HEADLAMP AIMING

(71) Applicant: FORD GLOBAL TECHNOLOGIES, LLC, Dearborn, MI (US)

(72) Inventors: Albert Ekladyous, Shelby Township, MI (US); Diane Marie LaHaie, Lake Orion, MI (US); Ghassan E. Mady, Plymouth, MI (US); Simon Howard Curwood, Canton, MI (US); Kelley Maria Adams-Campos, Ferndale, MI (US); Hardyal Singh, Canton, MI (US); Jeffrey Paul Spencer, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/664,105

(22) Filed: Oct. 25, 2019

(65) Prior Publication Data

US 2020/0149991 A1 May 14, 2020

Related U.S. Application Data

(63) Continuation of application No. 15/670,754, filed on Aug. 7, 2017, now Pat. No. 10,527,519, which is a
(Continued)

(51) Int. Cl.
*G01M 11/06* (2006.01)
*G01J 1/42* (2006.01)

(52) U.S. Cl.
CPC ......... *G01M 11/061* (2013.01); *G01J 1/4257* (2013.01); *G01M 11/064* (2013.01); *G01M 11/065* (2013.01)

(58) Field of Classification Search
CPC ............. G01M 11/061; G01M 11/064; G01M 11/065; G01J 1/4257
(Continued)

(56) References Cited

U.S. PATENT DOCUMENTS 2,291,114 A * 7/1942 Squyer ................. G01M 11/061
356/121
2,854,884 A * 10/1958 Deming ............... G01M 11/061
356/121
(Continued)

FOREIGN PATENT DOCUMENTS

DE 4322917 A1 4/1994
EP 1640700 A1 3/2006
(Continued)

OTHER PUBLICATIONS

English Machine Translation of DE4322917A1.
(Continued)

*Primary Examiner* — Roy M Punnoose
(74) *Attorney, Agent, or Firm* — David Coppiellie; King & Schickli, PLLC

(57) ABSTRACT

A system for aiming a headlamp of a vehicle includes a displaceable aiming surface and an imaging system. The imaging system includes a translatable aim box carrying at least one headlamp imager oriented to capture images of a single headlamp and/or one or more vehicle features adjacent to the single headlamp. At least one fixed imager is oriented to capture one or more images of the displaceable aiming surface. The translatable aim box may be configured to translate between the single headlamp and another headlamp. One or more computing devices are configured to perform methods for headlamp aim correction using the described system. Methods for headlamp aim correction are described.

8 Claims, 3 Drawing Sheets

Related U.S. Application Data continuation of application No. 15/139,622, filed on Apr. 27, 2016, now Pat. No. 9,863,843.

(58) Field of Classification Search
USPC ........................................................ 356/121
See application file for complete search history.

(56) References Cited

U.S. PATENT DOCUMENTS

| | | | | |
|---|---|---|---|---|
| 3,077,139 | A * | 2/1963 | Todd | G01M 11/061 356/121 |
| 3,515,483 | A * | 6/1970 | Irwin | G01M 11/065 356/121 |
| 3,532,433 | A * | 10/1970 | Irwin | G01M 11/06 356/121 |
| 3,830,570 | A * | 8/1974 | Groetzner | G01M 11/061 356/121 |
| 3,841,759 | A * | 10/1974 | Turner | G01M 11/062 356/121 |
| 3,843,262 | A * | 10/1974 | Lazarev | G01M 11/061 356/121 |
| 4,134,680 | A * | 1/1979 | Hunter | G01M 11/061 250/208.6 |
| 4,634,275 | A * | 1/1987 | Yoshida | G01M 11/065 348/95 |
| 5,164,785 | A * | 11/1992 | Hopkins | G01M 11/064 356/121 |
| 5,321,439 | A * | 6/1994 | Rogers | G01M 11/064 348/135 |
| 5,379,104 | A * | 1/1995 | Takao | G01M 11/064 356/121 |
| 5,485,265 | A * | 1/1996 | Hopkins | G01M 11/06 356/121 |
| 5,751,832 | A * | 5/1998 | Panter | G05B 19/401 356/121 |
| 8,422,004 | B1 * | 4/2013 | Ekladyous | G01J 1/4214 356/121 |
| 8,605,269 | B2 * | 12/2013 | Yotz | G01M 11/064 356/121 |
| 8,654,322 | B2 * | 2/2014 | Peterson | G01J 1/4228 356/121 |
| 8,928,869 | B2 * | 1/2015 | Ekladyous | G01M 11/064 356/121 |
| 8,988,672 | B2 * | 3/2015 | Wilds | G01M 11/065 356/121 |
| 2012/0224171 | A1 * | 9/2012 | Yotz | G01M 11/061 356/121 |
| 2013/0058111 | A1 * | 3/2013 | Ekladyous | G01B 11/27 362/460 |
| 2015/0233784 | A1 * | 8/2015 | Ekladyous | G01M 11/061 348/135 |

FOREIGN PATENT DOCUMENTS

| | | |
|---|---|---|
| EP | 1953520 A2 | 8/2008 |
| JP | 3103743 A | 4/1991 |

OTHER PUBLICATIONS

English Machine Translation of EP1640700A1.
English Machine Translation of EP1953520A2.
English Machine Translation of JP3103743A.
Office Action dated Jul. 30, 2018 for U.S. Appl. No. 15/670,754, filed Aug. 7, 2017.
Office Action dated Feb. 7, 2019 for U.S. Appl. No. 15/670,754, filed Aug. 7, 2017.

\* cited by examiner

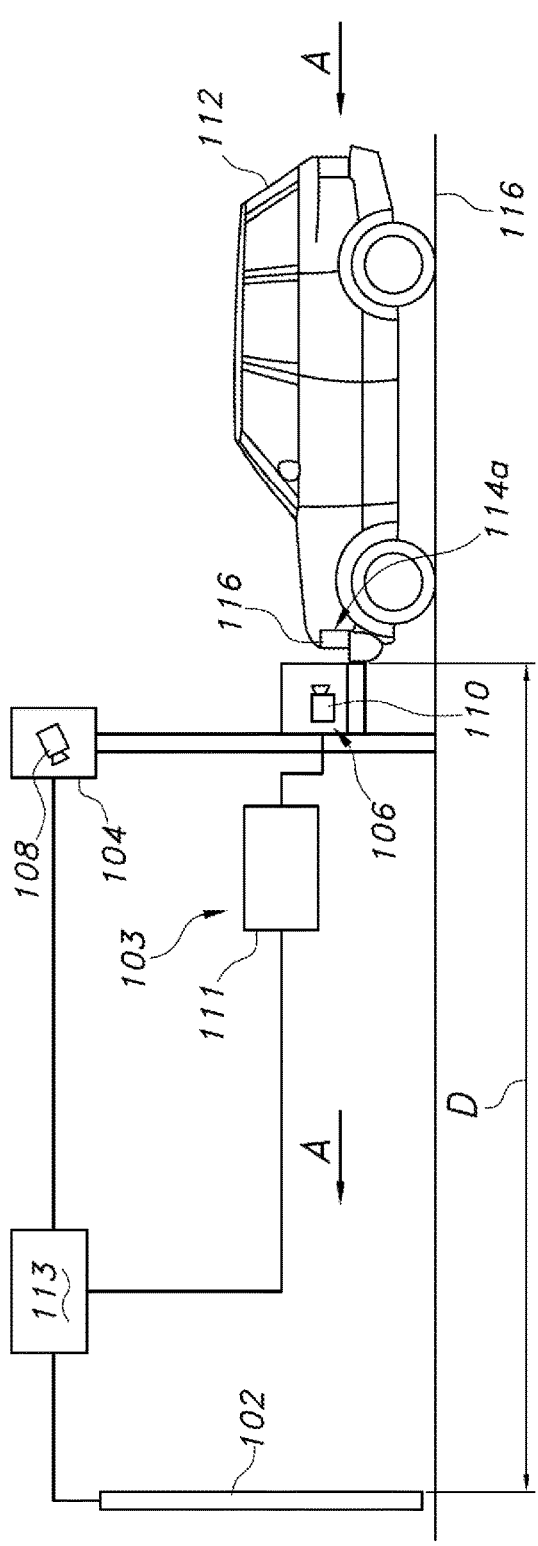
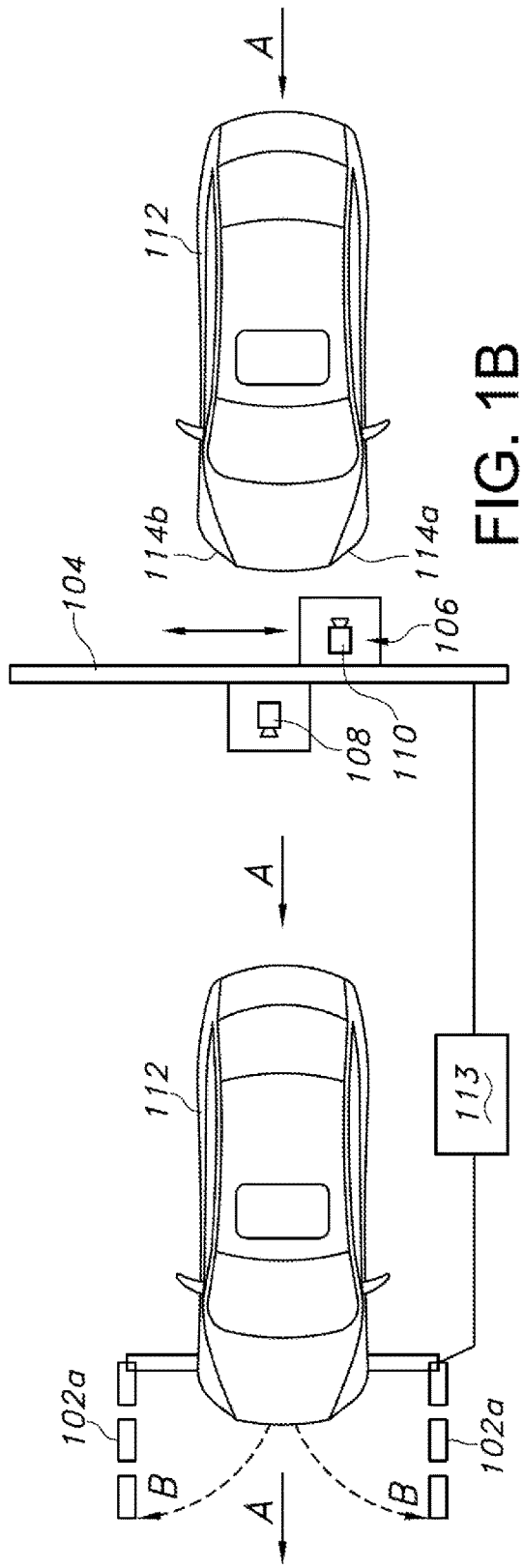
FIG. 1A
FIG. 1B

HIGH-VOLUME, LONG-RANGE HEADLAMP AIMING

This application is a continuation of U.S. patent application Ser. No. 15/670,754 filed on Aug. 7, 2017 (now U.S. Pat. No. 10,527,519) which in turn is a continuation of U.S. patent application Ser. No. 15/139,622 filed on Apr. 27, 2016, now U.S. Pat. No. 9,863,843, the entirety of the disclosures of each of which are incorporated herein by reference.

TECHNICAL FIELD

This disclosure relates generally to vehicle headlamps. More particularly, the disclosure relates to methods and systems for long-range and high-volume headlamp aiming in a manufacturing/assembly setting.

BACKGROUND

As is well-known, motor vehicles include front-mounted headlamps to illuminate vehicle-forward and vehicle-lateral portions of a roadway, improving the driver's ability to see the road and potential hazards or obstacles therein in low-light conditions. A wide variety of headlamp designs are known. At a high level, a vehicle typically includes a pair of front-mounted headlamps disposed substantially at opposed corners of the vehicle front, defining high- and low-beam illumination. This may be done by dedicated high- and low-beam light sources, or by a pair of headlamps each configured to selectively provide a high-beam illumination and a low-beam illumination.

It is desirable for a headlamp to illuminate as much of a vehicle-forward portion of a roadway as possible to maximize the ability of the driver to see. Balanced against this design goal is the need to prevent the vehicle headlamps from emitting light in an orientation that will potentially impair the vision of drivers of vehicles traveling in an opposed direction. For that reason, regulations specify that a beam cutoff, which is an upper border between a headlamp illumination falling above and below a particular intensity, must be located at a certain height above the ground at a specified distance in front of the vehicle.

To comply with such regulations, headlamps are typically made adjustable to allow the manufacturer and subsequently vehicle users to aim the light emitted from the headlamps as needed to provide a desired beam direction. In particular, vertical headlamp aiming is important since, when improperly aimed, a headlamp aimed too low may reduce low light visibility and object detection, or conversely if aimed too high may create glare, discomfort, and potentially hazard to other drivers.

In the manufacturing/assembly context, to analyze/adjust headlamp vertical aim a vehicle under test is placed at a predefined distance from a test surface (colloquially known as a "whiteboard") and/or measuring device. The headlamps are actuated, and the resulting illumination pattern is analyzed. From the analysis, the headlamps are adjusted to provide the desired illumination direction, beam cutoff, etc. This may occur manually or by use of automated devices, although it is most typical in the manufacturing/assembly context to implement automated/robotic headlamp beam analysis and aiming. Headlamp aiming equipment/systems ("aimers") are known which use projection analysis or direct measurement of beam cutoff to aim headlamps to nominal position.

Various design and manufacturing factors limit the ability to properly aim a headlamp to nominal position. These factors include manufacturing plant photometric aimer capability. Indeed, the general vertical aiming capability of conventional aimers used in the manufacturing/assembly context is limited to ±3 inches at a distance of 25 feet. This is excessive and does not satisfy customer sensitivity to headlamp vertical aim. Another issue is the short fore-aft distance between the headlamp beam pattern, the vehicle, and the camera systems used to analyse beam patterns, which is conventionally 2-5 feet, compared to the much longer distances at which headlamp aim is audited in the production setting (for example 25 feet in the U.S., and 10 meters in Europe). This magnifies the vertical aim error encountered at the conventional audit distance and beyond.

Specifically, modern headlamps can have a light beam range in the hundreds of feet. All vertical aim errors introduced during headlamp aiming are angular. Therefore, an error introduced at the 5 foot distance conventionally used for current headlamp analysis equipment is magnified at the normal 25 foot audit distance, and even more so at the headlamps range of hundreds of feet. Because of the 1:5-1:10 ratio between production headlamp aiming (2-5 feet) and conventional production headlamp aim auditing (25 feet), any error in vertical aim is magnified by a factor of 5 or more when the audit is performed, which is significant.

Artificial methods have been implemented to compensate for errors introduced by short aiming distances by artificially simulating longer aiming distances, for example Fresnel optical lenses, but are inadequate and indeed may themselves introduce error. A simple solution would be to lengthen the distance between the vehicle and the aiming surface during the production aiming process. However, most production aimers are not and cannot be calibrated for this distance. Moreover, a longer distance between a vehicle and an aiming surface or whiteboard such as 25 feet does not integrate well into current assembly line environment.

To solve this and other problems, the present disclosure relates to systems and methods for vehicle headlamp aiming. Advantageously, the described systems and methods allow a significantly longer aiming distance between a vehicle and an aiming surface, but integrate well into current production/assembly lines. By the ability to use longer aiming distances, vertical and other aiming errors are significantly reduced.

SUMMARY

In accordance with the purposes and benefits described herein, in one aspect a vehicle headlamp aiming system is described, comprising a displaceable aiming surface and an imaging system. The imaging system comprises an indexing aim box including at least one imager oriented to capture images of a headlamp and/or one or more vehicle features adjacent to the headlamp and at least one fixed imager oriented to capture one images of the displaceable aiming surface. The displaceable aiming surface is configured to selectively displace to allow passage of the vehicle. In embodiments, the indexing aim box is configured to translate between the headlamp and another headlamp, for example the right-hand headlamp and the left-hand headlamp of the vehicle, to sequentially block light emitted from the headlamp and the another headlamp. The displaceable aiming surface is positioned a predetermined distance from the vehicle and imaging system during a headlamp aiming procedure. In embodiments, the displaceable aiming surface is positioned at least 25 feet from the imaging system during a headlamp aiming procedure.

The system further includes one or more computing devices each comprising at least one processor, at least one memory, and storage, the at least one processor being configured to receive image inputs from the imaging system and to calculate therefrom an aim correction of the headlamp and/or of the another headlamp. An adjuster under the control of the at least one processor may be included to perform the calculated aim correction.

In another aspect, methods for aiming a vehicle headlamp using the described system are provided comprising, by at least one indexing aim box imager, capturing at least one headlamp and/or headlamp-adjacent vehicle feature image and determining therefrom a first headlamp optical center. At least one second headlamp low beam light beam cutoff image is captured by at least one fixed imager aimed at a displaceable aiming surface to determine therefrom a second headlamp cutoff height. The vehicle and imagers may be disposed at a predetermined distance from the displaceable aiming surface, which distance may be selected to correspond with an applicable headlamp aim audit distance specified by regulation or otherwise.

In a next step, the indexing aim box is translated away from the first headlamp and at least one first headlamp low beam light beam cutoff image is captured by the at least one fixed imager to determine therefrom a first headlamp cutoff height. In embodiments the indexing aim box is positioned to block light emitted from the second headlamp while determining the first headlamp light beam cutoff height, and vice-versa. An aim correction is calculated for the first headlamp and the second headlamp from the determined optical centers of each headlamp and the first headlamp and second headlamp cutoff heights.

In embodiments, the aim correction is calculated by providing one or more computing devices each comprising at least one processor, at least one memory, and storage. The at least one processor is configured to receive one or more captured images from the imaging system and to execute computer-readable instructions for determining the first headlamp optical center from the at least one headlamp and/or headlamp-adjacent vehicle feature image, for determining the first headlamp and second headlamp cutoff heights from the at least one first headlamp and second headlamp light beam cutoff image, and for calculating any required aim correction for the first headlamp and the second headlamp.

In embodiments, the methods include steps of positioning the vehicle at least 25 feet from the displaceable aiming surface while capturing the at least one headlamp-adjacent vehicle feature image and the at least one first and second headlamp light beam cutoff images. In embodiments, the calculated aim correction may be used to adjust the headlamp aim by an automated adjuster controlled by commands from the processor. On completing the headlamp aim correction, the displaceable aiming surface may be displaced and the vehicle may be translated to a next stop.

In the following description, there are shown and described embodiments of the disclosed systems and methods for headlamp aiming. As it should be realized, the systems and methods are capable of other, different embodiments and their several details are capable of modification in various, obvious aspects all without departing from the devices set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the disclosed systems and methods for vehicle headlamp aiming, and together with the description serve to explain certain principles thereof. In the drawing:

FIG. 1A depicts a vehicle headlamp aiming system according to the present disclosure in side view;

FIG. 1B shows the aiming system of FIG. 1A in top view;

Figure 2:
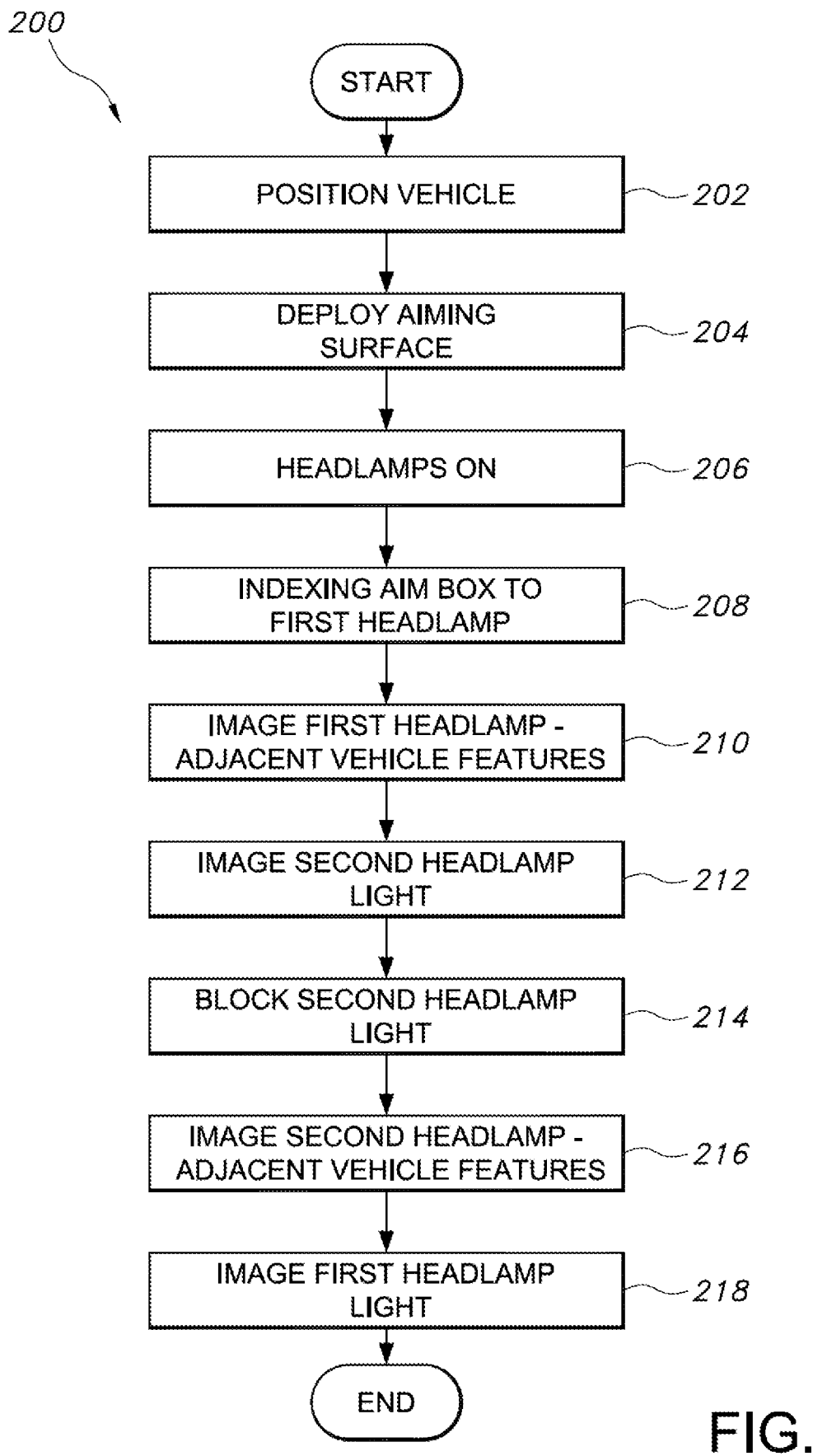
FIG. 2 shows in flow chart form a process for acquiring headlamp optical center and cutoff height inputs according to the present disclosure.

Reference will now be made in detail to embodiments of the disclosed systems and methods for headlamp aiming, examples of which are illustrated in the accompanying drawing figures.

DETAILED DESCRIPTION

FIG. 1A shows a vehicle headlamp aiming system 100 according to the present disclosure. As shown, the system 100 includes a displaceable aiming surface 102 and an imaging system 103 comprising at least a gantry 104 carrying an indexing aim box 106, and at least one fixed imager 108. The at least one fixed imager 108 may be supported by the gantry 104, or may otherwise be substantially fixed in place. In embodiments, the at least one fixed imager 108 may be a high dynamic range camera of known design which takes a series of images at varying exposures, combining images taken at a range of exposures from overexposed, underexposed, and balanced exposure to create a composite image.

The indexing aim box 106 includes an imager 110, which in embodiments is a vision system camera of known design. An adjuster 111 may be provided in association with the indexing aim box 106, including a suitable mechanism for adjusting a headlamp aim. One such known adjuster 111 comprises an aiming screwdriver operatively connected to a stepper motor, which automatically or under control of a human operator aligns to a headlamp aim adjusting screw to adjust a headlamp aim as needed.

In an embodiment (see FIG. 1B) the displaceable aiming surface 102 is defined by a pair of parallel pivoting panels 102a, 102b. In alternative embodiments, the displaceable aiming surface 102 may be defined by one or more roller-mounted drop-down panels, a pair of parallel sliding panels, one or more upwardly translatable panels, and others. The caveat is that the displaceable aiming surface 102 is configured to be displaced to allow a vehicle 112 to pass there-through, for reasons which will be explained in detail below.

The system 100 is under the control of at least one computing device 113 comprising at least one processor, memory, and storage, configured as will be described below to receive inputs from the imaging system 103 and to calculate any needed aiming corrections for the vehicle 112 headlamps. The computing device 113 may further be configured to control operation of the displaceable aiming surface 102, the indexing aim box 106, imagers 108 and 110, and other elements of the system 100.

In use in an aiming procedure 200 (see FIG. 2), a vehicle 112 is positioned (step 202) adjacent to the gantry 104 and the indexing aim box 106 is indexed to a position in front of one of headlamps 114a, 114b. The vehicle 112 may be driven to this position under its own power, or may be translated there by a suitable means, such as a conveyer 116 in a production setting (see arrows A in FIGS. 1A-1B). Gantry 104 and indexing aim box 106 are configured whereby the indexing aim box may be translated vertically, cross-vehicle, etc. to position the imager 110 directly in front of a chosen headlamp 114a, 114b. At this point, the displaceable aiming surface 102 is oriented (step 204) to provide a suitable aiming surface as shown in FIG. 1A, whereby beams of light emitted from the headlamps 114a, 114b will impinge on the aiming surface to provide a portion of the inputs that will be used to determine a needed aiming correction for the headlamps.

The vehicle 112 is positioned at a predetermined distance D from the displaceable aiming surface 102. Using the described system 100, in an embodiment distance D is selected to comport with regulatory auditing requirements for headlamp aim. For example, in the United States regulatory specifications require a headlamp aim auditing distance of 25 feet, and so the vehicle 112 and imaging system 103 are positioned at least 25 feet from the displaceable aiming surface 102. Other jurisdictions may require different auditing distances, for example 10 meters in Europe. Alternatively, an increased distance of, for example, 50 feet may provide a more accurate aiming, reduce inline aim error, etc.

As will be appreciated, by substantially matching or exceeding a prescribed regulatory aim auditing distance during the actual aiming procedure for headlamps 114a, 114b, audit error is significantly reduced. For example, as summarized above conventional headlamp aiming procedures employed under production conditions dispose a vehicle 2-5 feet from an aiming surface. Under such conditions, assuming a 0.125" vertical aim error, inline aim error is 0.12 degrees, audit error at 25 feet is 0.63 inches, and the error magnification scale factor is 5. On the other hand, using the presently described headlamp aiming system 100 with a distance D of 25 feet between the displaceable aiming surface 102/imaging system 103 and assuming the same 0.125" vertical aim error, inline aim error is 0.012 degrees, audit error at 25 feet is 0.063 inches, and the error magnification scale factor is 0.5. Thus, the geometry of the system 100 reduces vertical aim errors by a factor of 10. Further increasing the distance D between the displaceable aiming surface 102 and imaging system 103 will even further reduce the error magnification scale factor.

Next, the indexing aim box 106 is translated (step 208) to a position whereby the aim box imager 110 can capture images of first headlamp 114a and/or headlamp-adjacent vehicle features (step 210) such as the headlamp, an edge of the headlamp, a vehicle grille bar, and others. As is known, such images provide a suitable reference point for determining an optical center of the headlamp 114a low beam. In turn, the indexing aim box 106 is dimensioned to substantially prevent light emitted from the first headlamp 114a from reaching the displaceable aiming surface 102. This advantageously reduces stray light interference by light emitted by the first headlamp 114a with images of light emitted from the second headlamp 114b as will be described.

It is contemplated to actuate the headlamps 114a, 114b low beams (step 206) for the step (210) of determining the headlamp optical center. In such embodiments, the imager 110 may be provided with suitable known filters to allow detection of particular headlamp-adjacent features such as a headlamp edge 116 during the process of aiming an actuated headlamp. It is also contemplated to perform this portion of the described imaging without actuating the headlamps 114a, 114b, i.e. using only ambient light.

Prior to, concurrently with, or after the taking of images for determining an optical center of the first headlamp 114a, the at least one fixed imager 108 obtains one or more images of a light beam emitted by the second vehicle headlamp 114b (step 212), also on low beam. This occurs by taking images of at least the portion of the displaceable aiming surface 102 contacted by the headlamp light beam. These images are used to determine a cutoff height for the second headlamp 114b. With reference to the term "cutoff height," as is known the low beam pattern of a visually-aimable headlamp has a distinct horizontal cutoff below which the light beam is brighter, and above which the light beam is darker.

Next (step 214), the indexing aim box 106 is translated to a position whereby light emitted by the second headlamp 114b is substantially blocked. This concurrently allows light emitted by the first headlamp 114a to reach the displaceable aiming surface 102 and reduces stray light interference by light emitted by the second headlamp 114b with the images of light emitted from the first headlamp 114a. The aim box imager 110 captures images of the second headlamp 114b and/or headlamp-adjacent vehicle features (step 216) such as the headlamp, an edge of the headlamp, a vehicle grille bar, and others. These images are used for determining an optical center of the second headlamp 114b.

Prior to, concurrently with, or after the taking of images for determining an optical center of the second headlamp 114b, the at least one fixed imager 108 obtains one or more images of a light beam emitted by the first headlamp 114a (step 218). This again occurs by taking images of at least a portion of the displaceable aiming surface 102. These images are used to determine a cutoff height for the first headlamp 114a. Optionally, a cutoff threshold range may be established and headlamp height adjustments may be made to ensure that the first and second headlamp 114a, 114b cutoff heights are within that threshold. A suitable procedure is set forth in detail in U.S. Pat. No. 8,928,869, the contents of which are incorporated herein by reference in its entirety.

Figure 3:
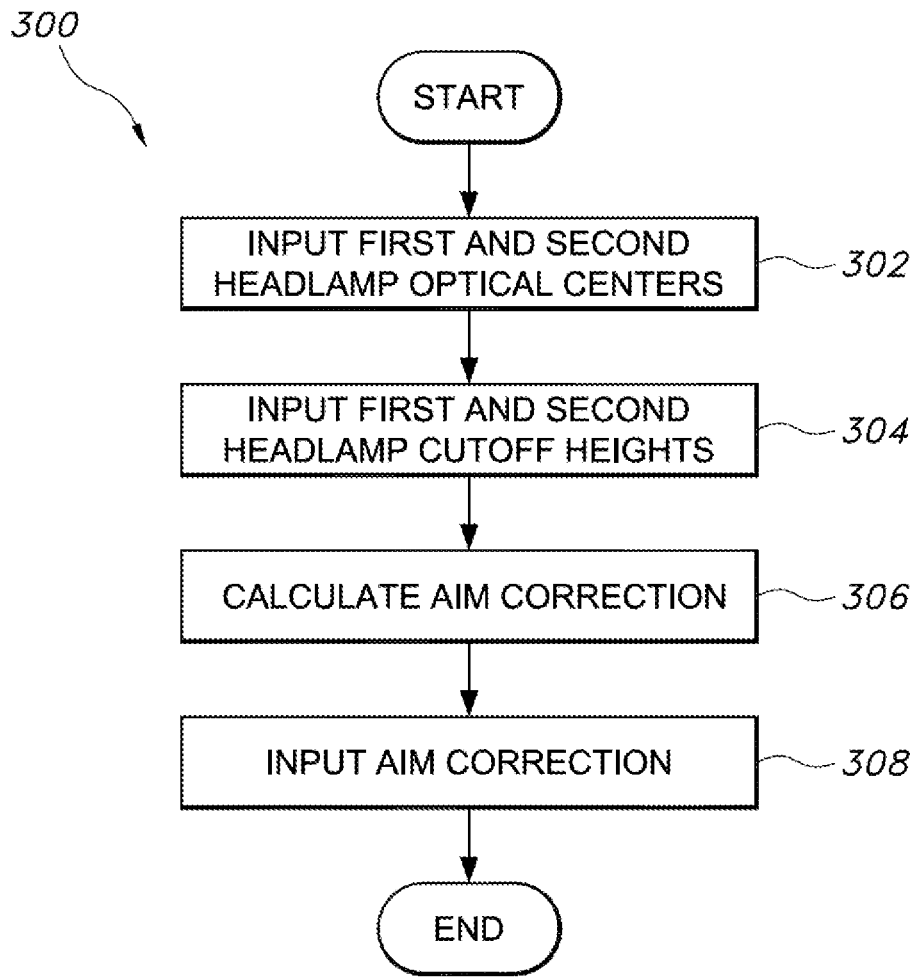
FIG. 3 shows in flow chart form a process for calculating a headlamp aim correction according to the present disclosure.

With reference to FIG. 3, an aim correction calculation process 300 includes steps of providing the above-described images as input to the at least one computing device 113 to calculate any required aim correction for the first and second headlamps 114a, 114b. The computing device processor is configured to include computer-executable instructions for determining a first headlamp optical center and a second headlamp optical center from the above-referenced aim box imager 110 images (step 302) Likewise the computing device includes executable instructions for determining first and second headlamp 114a, 114b cutoff heights (step 304) from the above-referenced fixed imager 108 images of light beams striking the displaceable aiming surface 102. Next (step 306), the computing device calculates an aim correction factor for both headlamps 114a, 114b from the first headlamp 114a optical center input, the first headlamp 114a cutoff height input, and the second headlamp 114b cutoff height input.

Finally (step 308), the aim correction is input to the adjuster 111, which performs the required headlamp 114a, 114b aim corrections. Such adjusters 111 and methods/devices for operating same are well known in the art, and do not require extensive description herein. However, as described above one such known adjuster 111 comprises an aiming screwdriver operatively connected to a stepper motor, which automatically or under control of a human operator aligns to a headlamp aim adjusting screw to adjust a headlamp aim as needed.

The process and algorithms for determining headlamp cutoff heights, headlamp optical centers, and aim correction factors from taken images are known in the art. At a high level, the cut-off heights are compared to an ideal headlamp aim height, which is related to a distance between the position of the cut-off (as determined from images taken by the at least one fixed imager 108) to a known ground surface supporting the vehicle 112 wheels. Optionally, as described above a threshold range of cutoff heights may be implemented as disclosed in U.S. Pat. No. 8,928,869

Optionally, the headlamp 114a, 114b aim may be verified after the steps of calculating an aim correction and adjusting the headlamp aim, and the above steps may be repeated as needed to ensure proper aiming of the headlamps. In an embodiment, a laser or other focused light projector may be provided which casts a horizontal line image such as a laser line across a width dimension of the displaceable aiming surface 102 at the determined cutoff heights for the first headlamp 114a and second headlamp 114b. This advantageously provides a reference point allowing visual confirmation of correctness of an aim correction procedure performed as described below. That is, by use of the optional focused light projector as described, a user is able to visually confirm that the adjusted cutoff height for the first headlamp 114a and second headlamp 114b align with the horizontal line projected by the focused light projector. Once the headlamp aiming procedure is completed and any needed aiming corrections applied, the displaceable aiming surface 102 may be displaced (arrows B) as needed to allow passage of the vehicle 112 to a next production line station.

The benefits of the presently disclosed systems and methods for headlamp aiming are apparent. The systems and methods are readily adaptable to common production-type settings, for example for incorporating into an assembly line. By keying a calculation of headlamp aim correction to a combination of a headlamp storage compartment aim set point and two determined headlamp cutoff heights, the process of headlamp aiming may be applied to vehicles of a near infinite range of headlamp heights relative to the ground, without requiring aim programs specifically tailored to the vehicle height or a specific headlamp feature. In turn, by using the described indexing aim box to both establish a headlamp optical center and concurrently block light to prevent light spill-over from one headlamp to another headlamp while obtaining a cutoff height for the another headlamp, error is reduced in determining a cutoff height and subsequently aiming the another headlamp.

Still more, by the described systems and methods long range headlamp aiming is made feasible in a manner easily integrated into with current production/assembly line settings. This provides a high volume procedure, i.e. a process allowing repeatable, accurate, and efficient aiming of headlamps of many vehicles in an assembly line setting even if the vehicle models are not identical and have differing vehicle (and therefore headlamp) heights relative to the ground. Such long-range headlamp aiming advantageously correlates well with current headlamp aim audit procedures, reducing or eliminating error magnification factors without significantly increasing cost, cycle timing, labor, and other production factors compared to conventional short-range aiming procedures. Indeed, the present systems and methods hold potential for eliminating any need for long-range headlamp aim auditing procedures in the future, further reducing cost, complexity, and plant processes associated with vehicle assembly.

Obvious modifications and variations are possible in light of the above teachings. All such modifications and variations are within the scope of the appended claims when interpreted in accordance with the breadth to which they are fairly, legally and equitably entitled.

What is claimed:

1. A system for aiming a headlamp of a vehicle, comprising:
    a displaceable aiming surface; and
    an imaging system comprising:
    a translatable aim box carrying an imager oriented to capture one or more images of a single headlamp of the vehicle and/or one or more features of the vehicle adjacent to the single headlamp;
    at least one fixed imager oriented to capture one or more images of the displaceable aiming surface;
    one or more computing devices each comprising at least one processor, at least one memory, and storage, the at least one processor being configured to receive image inputs from the imaging system and to calculate therefrom an aim correction for the single headlamp; and
    an adjuster configured for performing the calculated aim correction in response to commands received from the at least one processor.

2. The system of claim 1, wherein the displaceable aiming surface comprises a pair of panels adapted to selectively displace to allow passage of the vehicle therethrough.

3. The system of claim 1, wherein the displaceable aiming surface is disposed at least 25 feet from the single headlamp.

4. An imaging system, comprising:
    an aim box carrying an imager oriented to capture at least one image of a headlamp of the vehicle and/or one or more features of the vehicle adjacent to the single headlamp, the aim box being configured to prevent light emitted by another headlamp of the vehicle from reaching the imager;
    at least one fixed imager oriented to capture one or more images of a headlamp aiming surface disposed forward of the vehicle wherein the headlamp aiming surface is configured to selectively displace to allow passage of the vehicle;
    one or more computing devices each comprising at least one processor, at least one memory, and storage, the at least one processor being configured to receive image inputs from the imaging system and to calculate therefrom an aim correction of the headlamp and/or of the another headlamp; and
    an adjuster configured for performing the calculated aim correction in response to commands received from the at least one processor.

5. The imaging system of claim 4, wherein the aim box is adapted to translate between the headlamp and the another headlamp.

6. The imaging system of claim 4, wherein the at least one processor is configured to calculate the aim correction of the headlamp and/or of the another headlamp by executing computer-readable instructions for:
    determining an optical center of the headlamp and the another headlamp from the at least one image of the headlamp and/or headlamp-adjacent feature and at least one image of the another headlamp and/or the another headlamp-adjacent feature; and
    determining a low beam cutoff height of the headlamp and the another headlamp from the at least one image of the headlamp and the at least one image of the another headlamp; and
    calculating any required aim correction for the headlamp and/or the another headlamp from the determined headlamp optical center, the determined another headlamp optical center, the determined headlamp low beam cutoff height, and the determined another low beam headlamp cutoff height.

7. The imaging system of claim 4, wherein the aiming surface is a selectively displaceable aiming surface.

8. The imaging system of claim 7, wherein the selectively displaceable aiming surface is a divided surface comprising a pair of displaceable panels.

* * * * *